Figure 1:
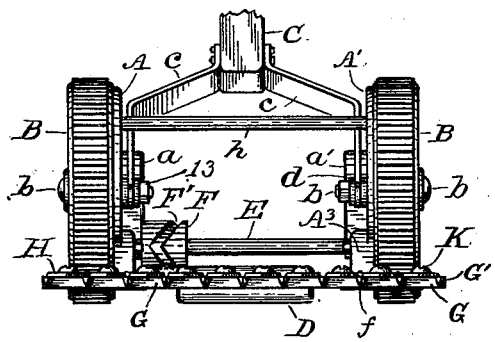

No. 635,983. Patented Oct. 31, 1899.
J. M. STEWART, C. V. DENMAN & C. F. WORTH.
MOWING MACHINE.
(Application filed Jan. 21, 1899.)
(No Model.) 3 Sheets—Sheet 1.

Witnesses:
Chas. E. Barrett.
O. Grube.

Inventors:
John M. Stewart,
Clinton V. Denman,
Charles F. Worth.
By E. T. Silvius
Attorney.

THE NORRIS PETERS CO., PHOTO-LITHO., WASHINGTON, D. C.

No. 635,983. Patented Oct. 31, 1899.
J. M. STEWART, C. V. DENMAN & C. F. WORTH.
MOWING MACHINE.
(Application filed Jan. 21, 1899.)
(No Model.) 3 Sheets—Sheet 2.
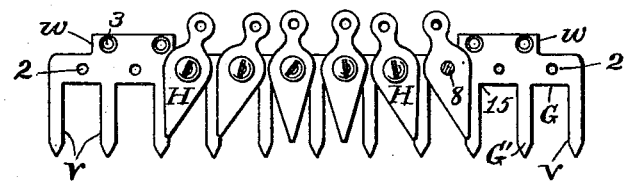
Fig. 7.
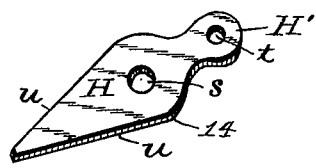
Fig. 8.
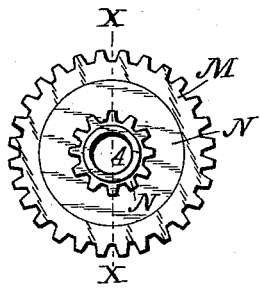
Fig. 9.
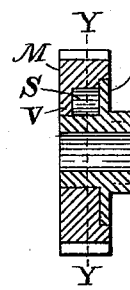
Fig. 10.
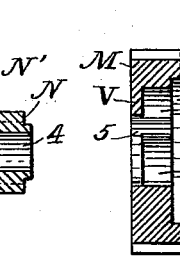
Fig. 11.
Fig. 12.
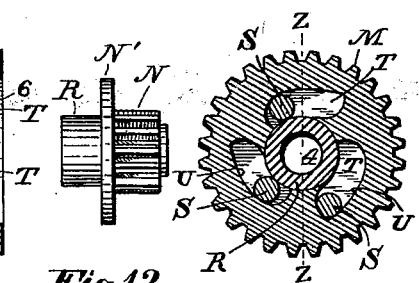
Fig. 13.
Fig. 14.
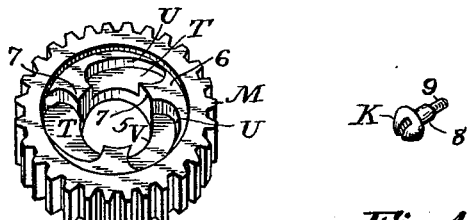
Fig. 16.
Fig. 15.
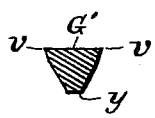
Fig. 17.
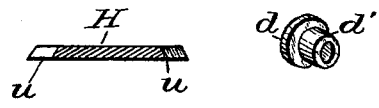
Fig. 18.   Fig. 19.
Witnesses:
Chas. E. Barrett
O. Grube
Inventors:
John M. Stewart,
Clinton V. Denman,
Charles F. Worth,
By E. T. Silvius
Attorney.
THE NORRIS PETERS CO., PHOTO-LITHO., WASHINGTON, D. C.

No. 635,983. Patented Oct. 31, 1899.
J. M. STEWART, C. V. DENMAN & C. F. WORTH.
MOWING MACHINE.
(Application filed Jan. 21, 1899.)

(No Model.) 3 Sheets—Sheet 3.

Witnesses:
Chas. E. Barrett.
O. Grube.

Inventors:
John M. Stewart.
Clinton V. Denman.
Charles F. Worth.
By E. T. Silvius,
Attorney.

UNITED STATES PATENT OFFICE.

JOHN M. STEWART, OF SPENCER, INDIANA, CLINTON V. DENMAN, OF MANSFIELD, OHIO, AND CHARLES F. WORTH, OF INDIANAPOLIS, INDIANA.

MOWING-MACHINE.

SPECIFICATION forming part of Letters Patent No. 635,983, dated October 31, 1899.

Application filed January 21, 1899. Serial No. 702,897. (No model.)

*To all whom it may concern:*

Be it known that we, JOHN M. STEWART, residing at Spencer, Owen county, Indiana, CLINTON V. DENMAN, residing at Mansfield, Richland county, Ohio, and CHARLES F. WORTH, residing at Indianapolis, Marion county, Indiana, citizens of the United States, have invented certain new and useful Improvements in Mowing-Machines; and we do declare the following to be a full, clear, and exact description of the invention, such as will enable others skilled in the art to which it appertains to make and use the same, reference being had to the accompanying drawings, and to the letters and numerals of reference marked thereon, which form a part of this specification.

Our invention relates to improvements in mowing-machines generally, and particularly to that class known as "lawn-mowers," and includes improved means for automatically throwing out of gear the cutting-knives and actuating mechanism when the machine is moved backward; and the invention consists, further, in the novel details of construction of certain parts and in the arrangement and combination of parts hereinafter fully described, and pointed out in the claims.

One object of our invention is to provide an improved light, compact, and perfect machine whereby grass and the like may be cut most effectively and also when growing close to hedges, borders, and shrubbery.

Another object is to provide a positive, durable, and noiseless clutching or ratchet mechanism to permit of the machine being moved backward without operating the cutting-knives.

These objects are fully attained in our invention, which is simple in design and useful and durable in use, while it may be constructed very cheaply.

Figure 2:
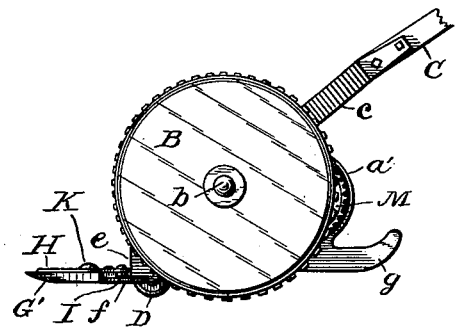
Figure 3:
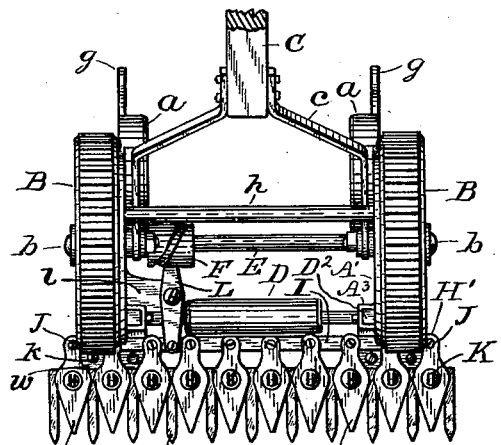
Figure 4:
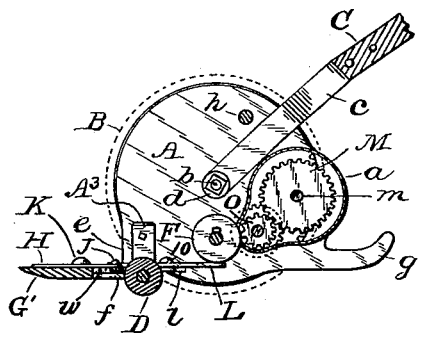
Figure 5:
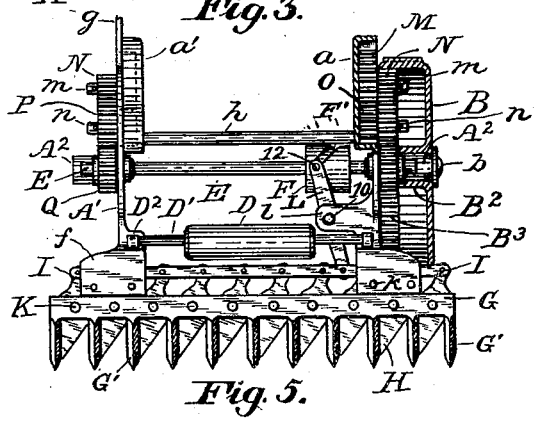
Figure 6:
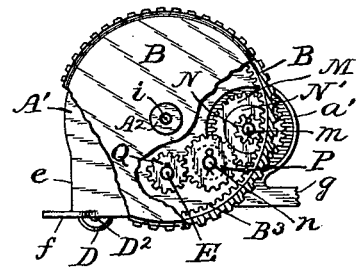
Figure 20:
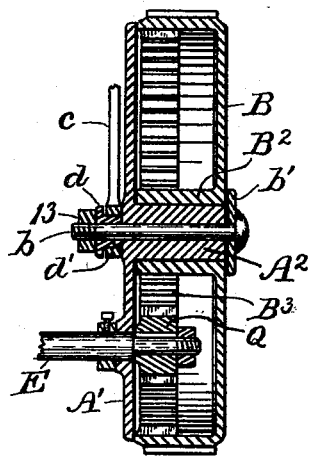

Referring to the drawings, Figure 1 represents a front elevation of a lawn-mower constructed in accordance with our invention; Fig. 2, a side elevation; Fig. 3, a top plan view; Fig. 4, a central vertical sectional view looking toward the right-hand side of the machine; Fig. 5, an inverted or bottom plan view of the cutting mechanism and parts of the frame and gearing, partly in section; Fig. 6, a fragmentary side elevation in which parts are broken away to expose the internally-arranged gearing; Fig. 7, a top plan view of the knife-bar and a number of the knives attached, showing the various positions assumed by the knives in operation; Fig. 8, a perspective view of one of the knives or sections of the upper cutters; Fig. 9, a front elevation of connected gear-wheels in which the clutching mechanism is provided; Fig. 10, a central sectional view on a line X X in Fig. 9; Fig. 11, a sectional view on a line Z Z in Fig. 13; Fig. 12, a side elevation of a detached part of the wheels shown in Fig. 9; Fig. 13, a sectional view on a line Y Y in Fig. 10; Fig. 14, a perspective view of a roller used in the clutching mechanism; Fig. 15, a perspective view of a part of the said gear-wheel shown in Fig. 9 and exposing the internal recesses and cams forming part of the clutching mechanism; Fig. 16, a perspective view of a screw-bolt by which the upper cutting-knives are pivoted; Fig. 17, a transverse sectional view of a finger forming part of the nether knife-bar; Fig. 18, a transverse sectional view of a cutting-knife; Fig. 19, a perspective view of a thimble on which the handle is mounted; Fig. 20, a vertical sectional detail view of the axle connections; and Fig. 21, a plan view, on an exaggerated scale, illustrating the drawing-in movement and defining the forms of construction of the knives and cutter-bar.

Similar letters and numerals of reference in the drawings designate like parts throughout the various views or figures.

In carrying out our invention we may adopt various types of frames and minor parts, including levers and gearing; but for the purpose of illustrating the adaptability of our invention we show a type of frame which is familiar, but with slight modifications adapted to coöperate with our improvements.

A clear understanding of the construction of the lawn-mower shown herewith may be had by reference to the letters and figures of reference, A A' designating the side plates of the frame, which are substantially of disk form, providing a covering for the otherwise open inner sides of the carrying-wheels B; $a\ a'$, recessed or offset parts of said plates inclosing gear-wheels and to which studs $m$ and $n$ are secured to carry the gear-wheels. The plates A A' have at the outside integral stationary axles $A^2$, journaled in hubs $B^2$ of the carrying-wheels, the latter being each retained in place by a bolt $b$, having a head and a washer $b'$ and passing through a central hole $i$ in the axle, with a threaded nut 13 at the inner end bearing against a thimble $d'$, having a washer-head $d$, the thimble being clamped rigidly by the bolt between the frame-plate and the nut and carrying revolubly the perforated ends of the irons $c$ of the handle C. A tie-bar $h$ is secured at its ends to the side plates. The side plates have projections $e$ at the lower front, terminating in horizontal brackets $f$, upon which the cutter-bar G is supported, preferably by projections $w$ and screw-bolts $k$, entering countersunk holes 3. Also at the front of the side plates are housings $A^3$, having a vertical opening in which is fitted a bar $D^2$ and adjustably secured to govern the height of the cutting-knives by a suitable set-screw, the lower end of the bar having a journal-bearing to receive and carry the journal of the axle $D'$ of the roller D, which supports the front of the machine. Projections $g$ at the rear provide supports when the machine is not in use. The plate A has an inwardly-projecting horizontal bracket $l$, upon which is pivoted a lever L, by which motion is transmitted to the cutting-knives from the cam F, having a groove $F'$ and rigidly secured to a shaft E, journaled at its ends in the side plates of the frame and extending through the frame-plates into the hollow carrying-wheels.

The carrying-wheels have suitable external teeth or ribs to prevent slipping at the periphery, and each is provided with internal peripheral gearing-teeth $B^3$, which are engaged by a gear-wheel N, connected to and actuating a gear-wheel M, both mounted on the stud $m$, and a gear-wheel O meshes with the wheel M and is secured to a gear-wheel P of greater diameter, both mounted on the stud $n$. This latter wheel meshes with a gear-wheel Q, rigidly secured to the rotating shaft E. This train of gearing is arranged at each side of the machine, although it would operate with one train of gearing.

In providing for running the machine in a reversed motion and permitting the cutting-knives to remain at rest we apply our clutching mechanism, which is usually termed a "ratchet," as it performs the same function, in connection with the gear-wheels M and N; but it is obvious that it could be applied equally well in connection with the wheels O and P or in similarly-arranged wheels in other parts of a train of mechanism, either with gear-teeth or other means as connecting devices. Further description of our clutching mechanism will be made hereinafter.

The cam F is of familiar cylindrical form of construction, having a groove $F'$ cut in its periphery obliquely, a convenient pitch being that shown, in which the groove runs from one end to the other end of the cylinder over half the circumference and returns at the other half, a revolution of the cam producing two complete strokes of the horizontal rocking lever L, which is provided with a roller-pin 12, running in the groove. A pivotal bolt or stud 10 supports the lever L on the bracket $l$.

The cutter-bar G performs the functions of a frame-brace for the side plates A A' and a supporting-frame for the upper cutting-knives H and for the stationary cutter bars or fingers G'. As will be seen, the upper cutting-knives are separately-formed horizontally-moving blades operating in unison and coacting with the fingers G', forming opposing shear-blades. As shown in Figs. 17 and 18, the cutting edges $u$ and $v$ are of the blunt shear type, which do not become dull and inefficient as quickly as the thin keen-edged blades. The bar G is designed to be made cheaply, so as to be renewed at small expense when necessary, and is composed, preferably, of cast-steel. It is of narrow oblong form adapted to be connected to the brackets $ff$ on the frame, as by projections $w\ w$, which reinforce the immediate points of support, being preferably cast integrally with the bar. In this construction, combined with the mower-frame described, the bar may be of any suitable length to extend laterally beyond the carrying-wheels, so that with a corresponding number of cutting-knives a swath is cut broader than the track of the machine. Thus neither wheel passes over the uncut grass. A suitable number of fingers G' are cast integrally with the bar and project forwardly or at a right angle to the edge 27 of the bar, which is opposite the projections $w\ w$. The top surfaces of the fingers are on a plane with the top of the bar upon which the moving knives slide, so that the whole top surface may be readily reground when the edges of the fingers become dull. The points of the fingers are adapted to act as dividers, being of the "shuttle" shape, and the body is approximately of V shape, as shown in Fig. 17, the bottom $y$ being narrower than the top.

In order to attain the perfection designed, the whole cutting mechanism is essentially constructed upon correlated lines, whereby results not heretofore obtained are produced. Thus in the plan of the bar G and fingers G' the latter are comparatively short and spaced relatively far apart in order to permit the use of an upper knife of sufficient width at the base to give a long sweep of its cutting edge, whereby the desired drawing-in motion is produced. The fingers are of convenient width, having parallel cutter edges $v\ v$. Conveniently close to the edge 27 of the bar and upon transverse lines equidistant between the fingers are pivot-holes 2, preferably having screw-threads in which the threaded end 9 of the pivot-bolts K are inserted, the body 8, of larger diameter than the threaded end, providing a shoulder against the bar, between which and the head of the bolt a knife H oscillates about the body 8 as an axis. The bolt-heads are of ample diameter to provide substantial top bearing for the knives and prevent their rising from the fingers.

The knives H are alike and are made, preferably, of sheet-steel, but may be cast, and of sufficient thickness to prevent springing away from the lower cutter-bars. The bottom of each knife has a plane surface, except that the rear end, forming the actuating-lever H', may be offset either upward or downward, if desired, being made integrally with the blade proper. A suitable pivotal hole $t$ is provided to receive a bolt J, secured to a reciprocating bar I, whereby the series of knives are directly operated, the bar being supported by the levers and connected to and actuated by the lever L.

Figure 21:
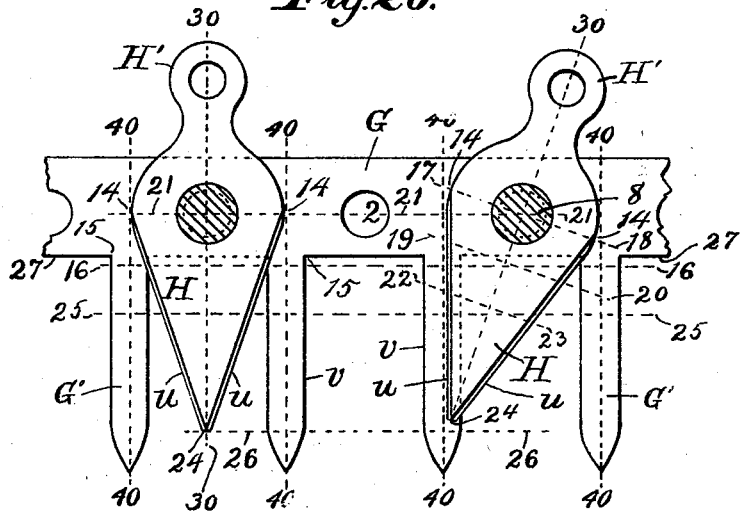

Referring now to Fig. 21, in which a top plan of a portion of the cutter-bar and the cutting-knives is shown in a proportional scale, it will be seen that imaginary lines are drawn, as 21, 16, 25, and 26, at right angles to the lines 40, indicating the centers of the fingers, and 17 18, 19 20, and 22 23 at right angles to the longitudinal center line 30 of the knife H. In designing the knives H the width of each between the opposite points 14 near a line drawn transversely through the axial opening $s$ is approximately equal to the distance between two adjacent center lines 40 of the fingers, being only sufficiently less to allow for clearance between adjacent blades, and is approximately two-thirds of the length of the knife between the pivotal center and the point 24 of the knife. The cutting edges $u\ u$ extend from the points 14 at each side in straight lines converging at the point 24. The top of the knife is slightly narrower than the bottom, so that the cutting edges are but slightly beveled, as before stated. Referring to the knife H in Fig. 21, which is set at its extreme of movement at one side, it will be apparent that this form of knife and arrangement with the lower bars provides for the greatest amount of drawing-in movement of the cutting edges so much desired, the points at the edge which overlaps the finger that corresponds to the lines 17, 19, and 22 being drawn very much back of the corresponding lines 21, 16, and 25 upon the fingers, while the points at the opposite edge corresponding to the lines 18, 20, and 23 are equally advanced, so that upon a return stroke these points upon the knife would draw in a distance double that shown at one side only—that is, the point on the edge at line 20 would draw back to the rear of line 16 as far as it is now shown in front of the same, at the same time having a lateral movement. Thus it will be seen that all the cutting-knives H move in unison in a quick horizontally rocking or vibratory motion oscillating about the pivotal bolt K, and it will be observed that this design of knife has the tendency, when cutting, to draw the grass inward, as desired, against the opposing fingers toward the back or rear end 15 of the fingers. In Fig. 3 the knives are shown in mid-position, while in Fig. 5 they are shown at the extreme limit of travel at one side.

In constructing a mowing-machine it is obvious that it could be made operative without the use of a clutching device; but it is well known that it is desirable to permit the knives and other parts to rest when the machine is run backward, and in order to accomplish this the well-known forms of the ratchet-pinions might be used in this construction; but as they have proved objectionable in several respects we prefer to employ the noiseless mechanism shown herein and which is adapted also for situations other than in mowing-machines, as will be apparent.

The gear-wheel M, as we construct the clutching device, has a plane surface at the back and a bore 5 extending through the center, which receives the carrying-hub projection R, formed integrally with the pinion N, the latter having a flange N' at the end of the gear-teeth next the projection R, the pinion N and its hub projection having a bore 4, forming a bearing on the supporting-stud $m$, and the exterior of the projection R forms a journal for the wheel M when in reversed motion. The latter wheel has preferably a recess 6 at the face to receive the flange N'. It is obvious, however, that the flange might bear against the front face proper of the wheel if the recess 6 is not formed. A suitable number of recesses T, preferably three in number, are provided within the wheel M and are divided by portions 7, extending to the outside of the projecting hub R, the flange N' covering them as chambers. The outer wall U of each chamber T is partly elliptical, the contour-line running inward from the circumference toward the center of the wheel, so as to form, with the hub R, a gradually-contracting passage for the rollers S, one of which is inserted in each recess and having squared ends are thereby guided between the flange N' and the back V of the wheel M, so that the rollers cannot tip over and become dislodged. It will be plainly seen that when a roller is in position at the wider end of its chamber it will not press against the hub R, which may freely rotate within the bore of the wheel M, and should the wheel N be rotated so as to cause the rollers S to roll toward the wider end of the wedge-like recess the rollers will not bind; but when the wheel N is rotated in the opposite direction the rollers, or part of them, at least, and the others in succession, will roll by gravity between the inclined wall U and the hub R until contacting with both, when binding takes place between the two, so that the pinion N must rotate the gear-wheel M or the gear-wheel M, if moved in the opposite direction, must rotate the pinion N. This form acts quickly, is noiseless, and is prompt in releasing, and thus has many advantages over other forms of clutching or ratchet mechanism.

It is obvious that in lieu of the cylindrical roller S we may employ spherical rollers or balls and provide suitable chambers therefor, although they may operate in the chambers shown. Either are suitably made of hardened steel. The chamber T may obviously be reversed to operate in an opposite direction.

The foregoing description will render the mode of operation of the machine and its parts plain without further description, apparatus of generally similar type being in common use; but it may be pointed out that a great advantage in employing our sectional or separately-formed grouped knives working on separate pivots lies in the great rapidity of motion which is attained, so that while the machine travels a given distance the knives will have made a sufficient number of strokes to cut the grass clearly without pushing over some uncut or tearing it off unevenly. A further advantage attained in the peculiar formation of our cutters is due to the maximum practical drawing motion produced, whereby the grass-stems are more readily severed, as by a saw or draw-knife drawn across them, rather than by a mere crushing cut.

Having thus described our invention, what we claim as new, and desire to secure by Letters Patent, is—

1. In a mowing-machine, the combination of the side plates, the toothed drive-wheels, the hollow axles, the bolts in the axles, the flanged thimbles secured by said bolts, the handles pivoted on said thimbles, the tie-bar, the forward projections, the rearward projections, the cutter-bar, the pivoted knives, the coupling-bar, the bracket *l*, the lever L, the rotating shaft situate below said axles, the cam, and the gear-wheels connecting said shaft with said drive-wheel teeth, substantially as set forth.

2. In a mowing-machine, the combination of the drive-wheels having internal gear-teeth and open inner sides, the frame comprising the side plates suitably connected and having fixed axles mounted in the hubs of said drive-wheels and covering the open sides of said drive-wheels, the cutter-bar mounted at the front of the drive-wheels, the pivoted cutting-knives on said cutter-bar, the coupling-bar, the roller mounted at the rear of said coupling-bar, the rotating shaft, the cam attached to said rotating shaft, the lever connecting with said cam and with said coupling-bar, a gear-wheel secured at the end of said rotating shaft, an axle-stud attached to one of such side plates, a gear-wheel mounted upon such stud and connecting with such internal gear-teeth and having a projecting hub and a flange or collar situate between the projecting hub and the gear-teeth thereof, a clutch gear-wheel mounted revolubly upon said projecting hub and against such flange and provided with chambers each having an outer wall inclined elliptically in a course from the periphery toward the center thereof, rollers in said chambers working between said outer walls and said projecting hub whereby said gear-wheel and said clutch gear-wheel are locked and released, and intermediate gear-wheels connecting said clutch gear-wheel with the gear-wheel at the end of said rotating shaft, substantially as set forth.

3. In a mowing-machine, the combination of the frame comprising the side plates suitably connected, the rotating shaft, the cam, the cutter-bar, the pivoted cutting-knives, the adjustable roller, the coupling-bar, the lever connecting the cam and the coupling-bar, the drive-wheels provided with internal gear-teeth, an axle-stud carried by the frame, a gear-wheel mounted upon the stud and actuated by the internal gear-teeth and provided with a projecting hub and also an annular collar situated between the projecting hub and the gear-teeth thereof, a clutch gear-wheel mounted revolubly upon such projecting hub and against such collar and provided with a chamber communicating with such projecting hub and having an outer wall opposing said hub and elliptically inclined in a course from the periphery toward the center of such clutch gear-wheel, a roller in said chamber working between said hub and said outer wall whereby said hub is locked to said clutch-wheel and released therefrom, and gear-wheels whereby said clutch-wheel and said rotating shaft are connected, substantially as set forth.

4. In a mowing-machine, the combination of the frame, the drive-wheels provided with gear-teeth, the carrying-axles, the cutting mechanism, a rotating shaft operating the cutting mechanism, an axle-stud carried by the frame, a gear-wheel mounted upon such stud and driven by the drive-wheel gear-teeth and provided with a projecting hub and also an annular collar situate between the projecting hub and the gear-teeth thereof, a clutch gear-wheel mounted revolubly upon such hub and against such collar and provided with chambers communicating with such hub and having each an outer wall opposing such hub and inclined thereto, a roller in each of such chambers working between such hub and such inclined wall whereby said hub and said clutch-wheel are locked together and released, and gear-wheels whereby such rotating shaft is operated by said clutching-wheels, substantially as set forth.

5. In a mowing-machine, the combination with the drive-wheels having bored hubs, of the frame comprising a pair of substantially disk-shaped side plates having each an integral bored axle mounted in a drive-wheel and provided with the short horizontal brackets extending forwardly and laterally at the lower front of said drive-wheels, the cutter-bar provided at the rear edge thereof with projections detachably secured to said horizontal brackets, the cutting-knives pivoted upon said cutter-bar, the coupling-bar, the lateral inwardly-projecting bracket attached to one of said side plates adjacent to said coupling-bar, the lever pivoted to said lateral bracket and connecting said coupling-bar, the bolts in said bored hubs each provided with a rigidly-secured flange-thimble at the inner side of the side plate, and the handle pivoted on said thimbles, substantially as set forth.

6. In a mowing-machine, the combination of the frame having the side plates provided with forwardly-projecting brackets and rearwardly-projecting arms, the rotating shaft journaled in the frame, the cam secured to the rotating shaft, the drive-wheels provided with internal peripheral gear-teeth, an axle-stud carried by the frame, a gear-wheel mounted upon the stud and meshing with the internal gear-teeth and having a projecting hub and a flange or collar situate between the projecting hub and the teeth thereof, a clutch gear-wheel mounted loose upon said projecting hub and against said flange and provided with chambers each having an outer wall inclined elliptically in a course from the periphery toward the center thereof, rollers in said chambers free to gravitate into the restricted passage formed by said inclined wall at one side and the outer surface of said projecting hub at the opposite side whereby said hub and said clutch-wheel are locked together, said rollers being adapted to recede when either said hub or said clutch-wheel is moved in an opposite direction to release said parts, and intermediate gear-wheels operated by said clutch-wheel to impart motion to said rotating shaft, substantially as shown and described.

7. In a clutching device, the combination of a supported stud, a toothed wheel provided with a projecting hub and mounted upon the stud, an annular collar situate upon said toothed wheel between the teeth thereof and said projecting hub, a toothed wheel mounted revolubly upon said projecting hub and against said annular collar and provided with a chamber communicating with said projecting hub and having an outer inclined wall opposing said hub, and a roller working in said chamber between said hub and said inclined wall, substantially as shown and described.

8. In a lawn-mower, the combination of the ground-wheels B B, the frame-plates A A' having the offset parts $a\ a'$, the shaft E, cam F, gear-wheels Q in said wheels and secured to said shaft, the gear-wheels in said offset parts and in said ground-wheels whereby said shaft is driven, the cutter-bar G mounted in advance of said frame-plates and secured thereto as a part thereof and having the fingers G', the cutter-knives H pivoted on said cutter-bar, the coupling-bar I, the lever L pivoted and supported by said frame-plates, the ground-roller mounted in said frame-plates and at the rear of said coupling-bar, the bored axles $A^2$ secured to said frame-plates and mounted in said ground-wheels B B, the bolts in said bored axles whereby said wheels are retained, the thimbles clamped against the inner sides of said frame-plates by said bolts, and the handle working on said thimbles, substantially as shown and described.

9. In a clutching device, the combination of the hub R the bored wheel M rotating on said hub and provided with the closed back V and the recesses T having the inclined outer walls and opening into the bore of the wheel and also at the front face thereof, the rollers in said recesses and working between said hub and the inclined wall of said recesses, the annular collar N' whereby said rollers are retained within the recesses, and the wheel N attached to said hub.

In testimony whereof we affix our signatures in presence of two witnesses.

JOHN M. STEWART.
CLINTON V. DENMAN.
CHARLES F. WORTH.

Witnesses:
WM. C. THOMPSON,
E. T. SILVIUS.